(12) United States Patent
Pulleti et al.

(10) Patent No.: US 9,609,524 B2
(45) Date of Patent: Mar. 28, 2017

(54) APPARATUS AND METHOD FOR PLANNING AND VALIDATING A WIRELESS NETWORK

(71) Applicant: Honeywell International Inc., Morristown, NJ (US)

(72) Inventors: Uday Pulleti, Machilipatnam (IN); Amol Gandhi, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 176 days.

(21) Appl. No.: 14/292,224

(22) Filed: May 30, 2014

(65) Prior Publication Data
US 2015/0350921 A1  Dec. 3, 2015

(51) Int. Cl.
*H04L 12/28* (2006.01)
*H04W 16/18* (2009.01)
*H04W 16/22* (2009.01)

(52) U.S. Cl.
CPC ........... *H04W 16/18* (2013.01); *H04W 16/22* (2013.01)

(58) Field of Classification Search
USPC .................. 370/241, 352, 354, 338, 351
See application file for complete search history.

(56) References Cited

U.S. PATENT DOCUMENTS

| | | |
|---|---|---|
| 5,063,562 A | 11/1991 | Barzilai et al. |
| 5,396,537 A | 3/1995 | Schwendeman |
| 5,537,414 A | 7/1996 | Takiyasu et al. |
| 6,381,215 B1 | 4/2002 | Hamilton et al. |
| 6,437,692 B1 | 8/2002 | Petite et al. |
| 6,499,006 B1 | 12/2002 | Rappaport et al. |
| 6,711,404 B1 * | 3/2004 | Arpee ................... H04W 16/18 455/423 |

(Continued)

FOREIGN PATENT DOCUMENTS

| | | |
|---|---|---|
| DE | 10314721 A1 | 11/2004 |
| EP | 1401171 A2 | 3/2004 |

(Continued)

OTHER PUBLICATIONS

Non-Final Rejection dated Jul. 8, 2009 in connection with U.S. Appl. No. 11/799,171; 27 pages.

(Continued)

*Primary Examiner* — Yemane Mesfin
*Assistant Examiner* — Mon Cheri Davenport

(57) ABSTRACT

A method includes displaying an image associated with a site at which a wireless network is to be installed or modified. The method also includes identifying positions of multiple wireless devices within the image. Different ones of the wireless devices are configured to support different wireless protocols, and the wireless devices and their positions form at least part of a design of the wireless network. The method further includes displaying, within the image, at least one of: (i) estimated wireless coverage areas of the wireless devices, (ii) estimated wireless connectivity between the wireless devices, and (iii) estimated communication routes between the wireless devices. In addition, the method includes validating the design of the wireless network against one or more network criteria using at least one of the estimated wireless coverage areas, the estimated wireless connectivity, and the estimated communication routes.

21 Claims, 11 Drawing Sheets

(56) References Cited

U.S. PATENT DOCUMENTS

| | | |
|---|---|---|
| 6,799,016 B2 | 9/2004 | Davis et al. |
| 6,847,316 B1 | 1/2005 | Keller |
| 7,168,022 B2 | 1/2007 | Miyake et al. |
| 7,246,045 B1 | 7/2007 | Rappaport et al. |
| 7,725,122 B1 | 5/2010 | Balakrishnan et al. |
| 7,813,382 B2 | 10/2010 | Manjeshwar et al. |
| 8,396,007 B2 | 3/2013 | Gonia et al. |
| 8,547,906 B2 | 10/2013 | Budampati et al. |
| 8,756,412 B2 | 6/2014 | Pulini et al. |
| 2002/0120671 A1 | 8/2002 | Daffner et al. |
| 2002/0122230 A1 | 9/2002 | Izadpanah et al. |
| 2002/0152299 A1 | 10/2002 | Traversat et al. |
| 2003/0109270 A1 | 6/2003 | Shorty |
| 2003/0206535 A1 | 11/2003 | Shpak |
| 2004/0230899 A1 | 11/2004 | Pagnano et al. |
| 2004/0259533 A1 | 12/2004 | Nixon et al. |
| 2004/0259555 A1 | 12/2004 | Rappaport et al. |
| 2005/0013294 A1 | 1/2005 | Cypher |
| 2005/0030905 A1 | 2/2005 | Luo et al. |
| 2005/0041586 A1 | 2/2005 | Jiang |
| 2005/0059379 A1 | 3/2005 | Sovio et al. |
| 2005/0111416 A1 | 5/2005 | Ginzburg |
| 2005/0117515 A1 | 6/2005 | Miyake |
| 2005/0125602 A1 | 6/2005 | Fambon et al. |
| 2005/0141553 A1 | 6/2005 | Kim et al. |
| 2005/0201349 A1 | 9/2005 | Budampati |
| 2005/0228509 A1 | 10/2005 | James |
| 2005/0281215 A1 | 12/2005 | Budampati et al. |
| 2006/0002368 A1 | 1/2006 | Budampati et al. |
| 2006/0045011 A1 | 3/2006 | Aghvami et al. |
| 2006/0171344 A1 | 8/2006 | Subramanian et al. |
| 2006/0171346 A1 | 8/2006 | Kolavennu et al. |
| 2006/0227729 A1 | 10/2006 | Budampati et al. |
| 2006/0256740 A1 | 11/2006 | Koski |
| 2006/0274644 A1 | 12/2006 | Budampati et al. |
| 2006/0274671 A1 | 12/2006 | Budampati et al. |
| 2006/0287001 A1 | 12/2006 | Budampati et al. |
| 2007/0030816 A1 | 2/2007 | Kolavennu |
| 2007/0030832 A1 | 2/2007 | Gonia et al. |
| 2007/0073861 A1 | 3/2007 | Amanuddin et al. |
| 2007/0076638 A1 | 4/2007 | Kore et al. |
| 2007/0077941 A1 | 4/2007 | Gonia et al. |
| 2007/0087763 A1 | 4/2007 | Budampati et al. |
| 2007/0091824 A1 | 4/2007 | Budampati et al. |
| 2007/0091825 A1 | 4/2007 | Budampati et al. |
| 2007/0153677 A1 | 7/2007 | McLaughlin et al. |
| 2007/0155423 A1 | 7/2007 | Carmody et al. |
| 2007/0237137 A1 | 10/2007 | McLaughlin |
| 2007/0280178 A1 | 12/2007 | Hodson et al. |
| 2008/0074993 A1 | 3/2008 | Vainola |
| 2008/0075000 A1 | 3/2008 | Robbins |
| 2008/0125647 A1 | 5/2008 | Rosengren et al. |
| 2008/0144493 A1 | 6/2008 | Yeh |
| 2008/0238561 A1 | 10/2008 | Otsuka et al. |
| 2008/0273547 A1 | 11/2008 | Phinney |
| 2009/0006010 A1 | 1/2009 | Van Sloun et al. |
| 2009/0037998 A1 | 2/2009 | Adhya et al. |
| 2009/0060192 A1 | 3/2009 | Budampati et al. |
| 2009/0265143 A1 | 10/2009 | Kaufman et al. |
| 2010/0070634 A1 | 3/2010 | Ranjan et al. |
| 2014/0036712 A1* | 2/2014 | Dewey ............... G05B 19/4185 370/252 |

FOREIGN PATENT DOCUMENTS

| | | |
|---|---|---|
| EP | 1401171 A3 | 5/2005 |
| GB | 2427329 A | 12/2006 |
| WO | WO01/35190 A2 | 5/2001 |
| WO | WO01/35190 A3 | 5/2001 |
| WO | WO 03/079616 A1 | 9/2003 |
| WO | WO 03/089995 A2 | 10/2003 |
| WO | WO 2004/047385 A2 | 6/2004 |
| WO | WO 2006/017994 A1 | 2/2006 |
| WO | WO 2006/053041 A1 | 5/2006 |
| WO | WO 2007/143409 A2 | 12/2007 |
| WO | WO 2007/143420 A2 | 12/2007 |
| WO | WO 2007/143421 A2 | 12/2007 |
| WO | WO 20071143419 A2 | 12/2007 |
| WO | WO 2004/032392 A2 | 4/2015 |

OTHER PUBLICATIONS

Final Rejection dated Feb. 5, 2010 in connection with U.S. Appl. No. 11/799,171; 31 pages.
Non-Final Rejection dated Sep. 1, 2010 in connection with U.S. Appl. No. 11/799,171; 27 pages.
Non Final Rejection dated Feb. 22, 2011 in connection with U.S. Appl. No. 11/799,171; 26 pages.
Final Rejection dated Jun. 13, 2011 in connection with U.S. Appl. No. 11/799,171; 27 pages.
Non-Final Rejection dated Feb. 1, 2012 in connection with U.S. Appl. No. 11/799,171; 26 pages.
Final Rejection dated May 15, 2012 in connection with U.S. Appl. No, 11/799,171; 27 pages.
Non-Final Rejection dated Jul. 21, 2010 in connection with U.S. Appl. No. 11/880,116; 7 pages.
Non-Final Rejection dated Oct. 5, 2013 in connection with U.S. Appl. No. 12/106,606; 21 pages.
Final Rejection dated Feb. 2, 2011 in connection with U.S. Appl. No. 12/106,606; 21 pages.
Advisory Action dated Apr. 25, 2011 in connection with U.S. Appl. No. 12/106,606; 3 pages.
Non-Final Rejection dated May 12, 2011 in connection with U.S. Appl. No. 12/106,606; 21 pages.
Final Rejection dated Nov. 10, 2011 in connection with U.S. Appl. No. 12/106,606; 20 pages.
Advisory Action dated Jan. 30, 2012 in connection with U.S. Appl. No. 12/106,606; 3 pages.
Non-Final Rejection dated Mar. 30, 2012 in connection with U.S. Appl. No. 12/762,215; 12 pages.
Final Rejection dated Sep. 20, 2012 in connection with U.S. Appl. No. 12/762,215; 14 pages.
Non-Final Rejection dated Mar. 1, 2013 in connection with U.S. Appl. No. 12/762,215; 16 pages.
Non-Final Rejection dated Sep. 9, 2013 in connection with U.S. Appl. No. 12/762,215; 16 pages.
Non-Final Rejection dated Nov. 11, 2012 in connection with U.S. Appl. No. 13/077,692; 8 pages.
Final Rejection dated Mar. 26, 2013 in connection with U.S. Appl. No. 13/077,692; 10 pages.
International Search Report in connection with PCT/US2007/069717 filed May 25, 2007; 3 pages.
Written Opinion in connection with PCT/US2007/069717 filed May 25, 2007; 5 pages.
International Search Report in connection with PCT/US2007/069614 filed May 24, 2007; 22 pages.
Written Opinion in connection with PCT/US20047/069614 filed May 24, 2007; 5 pages.
International Search Report in connection with PCT/US2007/069710 filed May 25, 2007; 3 pages.
Written Opinion in connection with PCT/US2007/069710 filed May 25, 2007; 6 pages.
International Search Report in connection with PCT/US2007/069705 filed May 25, 2007; 3 pages.
Written Opinion in connection with PCT/US2007/069705 filed May 25, 2007; 5 pages.
International Search Report in connection with PCT/DE2003/03848 filed Nov. 11, 2003; 6 pages.
International Search Report in connection with PCT/CN2005/001295 filed Aug. 18, 2005; 4 pages.
International Search Report in connection with PCT/US2000/31166 filed Nov. 13, 2000; 3 pages.
International Search Report in connection with PCT/US2005/040591 filed Nov. 8, 2005; 3 pages.
International Search Report in connection with PCT/2003/005573 filed Mar. 5, 2003; 3 pages.

(56) References Cited

OTHER PUBLICATIONS

IEP Search Report in connection with EP 1401171 A3; Mar. 4, 2005; Sick AG; 2 pages.
GB Search Report in connection with GB 2427329 A: Sep. 21, 2006; 1 page.
Pulini, et al.; "Apparatus and Method for Measuring and Reporting Redundant Wireless Connectivity Over Time"; U.S. Appl. No. 13/947,951, filed Jul. 22, 2013; 40 pages.
Pulini, et al.; "Apparatus and Method for Reporting of Communication Path Quality Within a Wireless Network"; U.S. Appl. No. 13/948,077, filed Jul. 22, 2013; 40 pages.
Aiello, et al.; "Wireless Distributed Measurement System by Using Mobile Devices"; IEEE; Intelligent Data Acquisition and Advanced Computing Systems; Sep. 5-7, 2005; 4 pages.
Chen, et al.; "Dependability Enhancement for IEEE. 802.11 Wireless LAN with Redundancy Techniques"; International Conference on Dependable Systems and Networks; 2003, 8 pages.
Kolavenna, Dr. S.; "WNSIA MAC Layer"; Presentation at ISA SP100 Meeting; Feb. 14, 2007; 24 pages [see especially p. 17].
Pereira, J.M. Dias; "A Fieldbus Prototype for Educational Purposes"; IEEE Instrumentation & Measurement Magazine; New York, NY; vol. 7, No. 1; Mar. 2004; 8 pages.
"Service Manual: SmartRadar FlexLine"; Honeywell Enraf; http://www.honeywell.com/ps; 2012; 4 pages.
"Connect802"; Network Orange; http://www.netorange.com/products/connect802/suite_spot_survey/tt_connect802_survey.html; 2008; 3 pages.
Screenshot of Honeywell OneWireless R120 User Interface; released Jun. 2009; 1 page.

* cited by examiner

APPARATUS AND METHOD FOR PLANNING AND VALIDATING A WIRELESS NETWORK

TECHNICAL FIELD

This disclosure relates generally to wireless networks and more specifically to an apparatus and method for planning and validating a wireless network.

BACKGROUND

Industrial control and automation systems are often used to automate large and complex industrial processes. These types of systems routinely include wireless networks that facilitate communication between a wide range of wireless devices. Often times, wireless devices cannot communicate directly with one another because of excessive distances, physical obstructions, or other factors. Additional wireless routing devices can therefore be installed in a wireless network in order to route data to and from the wireless devices.

Before installing a wireless network, the cost of deploying the wireless network can be estimated by identifying the wireless devices to be used in the network. Unlike wired networks where it is often straight-forward to determine the number of devices and cabling requirements, wireless networks pose challenges due to the uncertainties of wireless communications. A typical system integrator may not be well-versed with wireless propagation characteristics and may tend to over-design or under-design a wireless network. An over-designed wireless network (with more wireless devices than needed) has a higher cost and a higher complexity. An under-designed network (with fewer wireless devices than needed) results in an unreliable network and requires additional time and cost for diagnosing and rectifying the faults in the network.

SUMMARY

This disclosure provides an apparatus and method for planning and validating a wireless network.

In a first embodiment, a method includes displaying an image associated with a site at which a wireless network is to be installed or modified. The method also includes identifying positions of multiple wireless devices within the image. Different ones of the wireless devices are configured to support different wireless protocols, and the wireless devices and their positions form at least part of a design of the wireless network. The method further includes displaying, within the image, at least one of: (i) estimated wireless coverage areas of the wireless devices, (ii) estimated wireless connectivity between the wireless devices, and (iii) estimated communication routes between the wireless devices. In addition, the method includes validating the design of the wireless network against one or more network criteria using at least one of the estimated wireless coverage areas, the estimated wireless connectivity, and the estimated communication routes.

In a second embodiment, an apparatus includes at least one memory configured to store an image associated with a site at which a wireless network is to be installed or modified. The apparatus also includes at least one processing device configured to initiate display of the image and identify positions of multiple wireless devices within the image. Different ones of the wireless devices are configured to support different wireless protocols, and the wireless devices and their positions form at least part of a design of the wireless network. The at least one processing device is also configured to initiate display, within the image, of at least one of: (i) estimated wireless coverage areas of the wireless devices, (ii) estimated wireless connectivity between the wireless devices, and (iii) estimated communication routes between the wireless devices. The at least one processing device is further configured to validate the design of the wireless network against one or more network criteria using at least one of the estimated wireless coverage areas, the estimated wireless connectivity, and the estimated communication routes.

In a third embodiment, a non-transitory computer readable medium embodies a computer program. The computer program includes computer readable program code for initiating display of an image associated with a site at which a wireless network is to be installed or modified and identifying positions of multiple wireless devices within the image. Different ones of the wireless devices are configured to support different wireless protocols, and the wireless devices and their positions form at least part of a design of the wireless network. The computer program also includes computer readable program code for initiating display, within the image, of at least one of: (i) estimated wireless coverage areas of the wireless devices, (ii) estimated wireless connectivity between the wireless devices, and (iii) estimated communication routes between the wireless devices. The computer program further includes computer readable program code for validating the design of the wireless network against one or more network criteria using at least one of the estimated wireless coverage areas, the estimated wireless connectivity, and the estimated communication routes.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 12, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
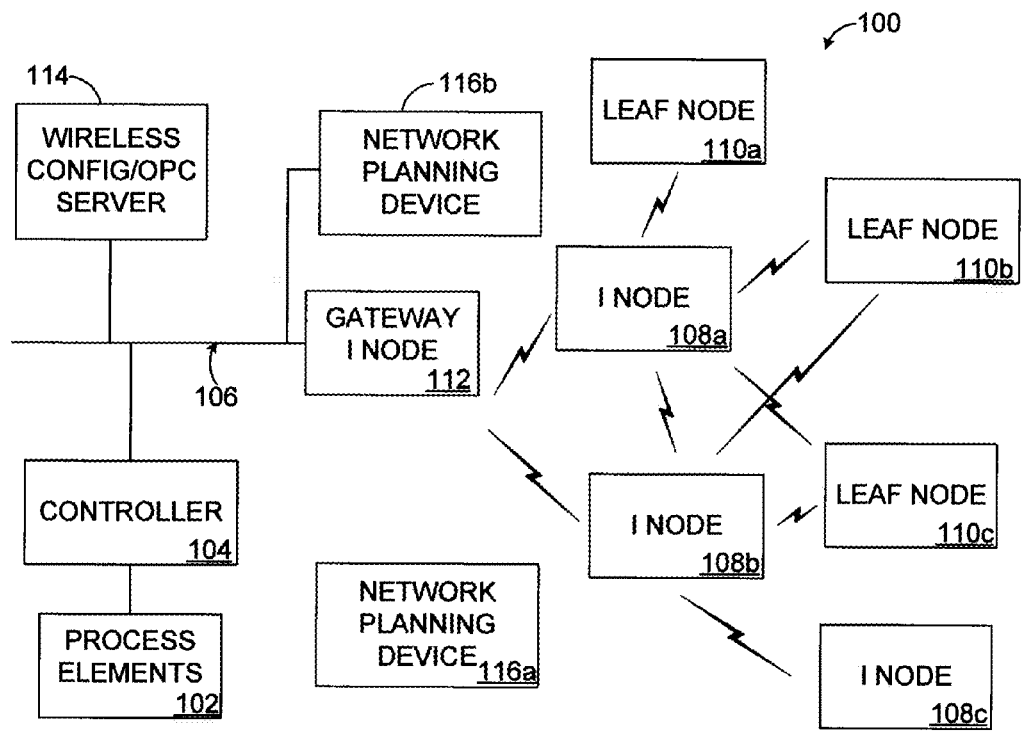
FIG. 1 illustrates an example industrial control and automation system according to this disclosure.

FIG. 1 illustrates an example industrial control and automation system 100 according to this disclosure. As shown in FIG. 1, the system 100 includes one or more process elements 102. The process elements 102 represent components in a process system that perform any of a wide variety of functions. For example, the process elements 102 could represent sensors, actuators, or any other or additional industrial equipment in a processing environment. Each process element 102 includes any suitable structure for performing one or more functions in a process system. Also, a process system represents any system or portion thereof configured to process one or more materials in some manner.

A controller 104 is coupled to the process elements 102. The controller 104 controls the operation of one or more of the process elements 102. For example, the controller 104 could receive information associated with the process system, such as sensor measurements from some of the process elements 102. The controller 104 could use this information to generate control signals for others of the process elements 102, such as actuators, to thereby adjust the operation of those process elements 102. The controller 104 includes any suitable structure for controlling one or more process elements 102. The controller 104 could, for example, represent a computing device executing multi-variable or other control logic.

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks, metropolitan area networks, wide area networks, all or a portion of a global network, or any other communication system(s) at one or more locations. As a particular example, the network 106 could include a FAULT TOLERANT ETHERNET network from HONEYWELL INTERNATIONAL INC.

As shown in FIG. 1, the system 100 also includes (or will be modified to include) one or more wireless networks for communicating with wireless sensors or other wireless field devices. In this example, a wireless network includes infrastructure nodes ("I nodes") 108a-108c, leaf nodes 110a-110c, and gateway infrastructure nodes 112.

The infrastructure nodes 108a-108c and leaf nodes 110a-110c engage in wireless communications with each other. For example, the infrastructure nodes 108a-108c may receive data transmitted over the network 106 (via a gateway infrastructure node 112) and wirelessly communicate the data to the leaf nodes 110a-110c. Also, the leaf nodes 110a-110c may wirelessly communicate data to the infrastructure nodes 108a-108c for forwarding to the network 106 (via a gateway infrastructure node 112). In addition, the infrastructure nodes 108a-108c may wirelessly exchange data with one another. In this way, the nodes 108a-108c, 112 (and optionally the nodes 110a-110c) form a wireless network capable of providing wireless coverage to leaf nodes and other devices in a specified area, such as a large industrial complex.

In this example, the nodes 108a-108c and 110a-110c are divided into infrastructure nodes and leaf nodes. The infrastructure nodes 108a-108c typically represent routing devices that can store and forward messages for other devices. Infrastructure nodes 108a-108c are typically line-powered devices, meaning these nodes receive operating power from an external source. Infrastructure nodes 108a-108c are typically not limited in their operations since they need not minimize power consumption to increase the operational life of their internal power supplies. On the other hand, the leaf nodes 110a-110c are generally non-routing devices that do not store and forward messages for other devices (although they could). Leaf nodes 110a-110c typically represent devices powered by local power supplies, such as nodes that receive operating power from internal batteries or other internal power supplies. Leaf nodes 110a-110c are often more limited in their operations in order to help preserve the operational life of their power supplies.

The nodes 108a-108c and 110a-110c include any suitable structures facilitating wireless communications, such as radio frequency (RF) frequency-hopping spread spectrum (FHSS) or direct sequence spread spectrum (DSSS) transceivers. The nodes 108a-108c and 110a-110c could also include other functionality, such as functionality for generating or using data communicated over the wireless network. For example, the leaf nodes 110a-110c could include wireless sensors used to measure various characteristics within an industrial facility. The sensors could collect and communicate sensor readings to the controller 104 via the wireless network. The leaf nodes 110a-110c could also include wireless actuators that receive control signals from the controller 104 and that adjust the operation of the industrial facility. In this way, the leaf nodes may include or operate in a similar manner as the process elements 102 physically connected to the controller 104. The leaf nodes 110a-110c could further include handheld user devices (such as INTELATRAC devices from HONEYWELL INTERNATIONAL INC.), mobile stations, programmable logic controllers, process controllers, or any other or additional devices. The infrastructure nodes 108a-108c, 112 may also include any of the functionality of the leaf nodes 110a-110c or the controller 104.

The gateway infrastructure node 112 functions as an infrastructure node and communicates wirelessly with, transmits data to, and receives data from one or more infrastructure nodes and possibly one or more leaf nodes. The gateway infrastructure node 112 also converts data between protocol(s) used by the network 106 and protocol(s) used by the nodes 108a-108c and 110a-110c. For example, the gateway infrastructure node 112 could convert Ethernet-formatted data transported over the network 106 into a wireless protocol format (such as an IEEE 802.11a, 802.11b, 802.11g, 802.11n, 802.15.3, 802.15.4, or 802.16 format or an ISA100.11a format) used by the nodes 108a-108c and 110a-110c. The gateway infrastructure node 112 could also convert data received from one or more of the nodes 108a-108c and 110a-110c into Ethernet-formatted data for transmission over the network 106. In addition, the gateway infrastructure node 112 could support various functions, such as network creation and security, used to create and maintain a wireless network. The gateway infrastructure node 112 includes any suitable structure for facilitating communication between components or networks using different protocols.

In particular embodiments, various wireless nodes 108a-108c, 112 (and possibly nodes 110a-110c) in the wireless network of FIG. 1 form a mesh network communicating at 2.4 GHz or 5.8 GHz. Also, in particular embodiments, data can be injected into the wireless mesh network through the infrastructure nodes or leaf nodes. This can therefore provide versatile, multifunctional, plant-wide coverage for wireless sensing, asset location tracking, personnel tracking, wireless communications, and any other or additional functionality as desired.

A wireless configuration and OLE for Process Control (OPC) server 114 can configure and control various aspects of the system 100. For example, the server 114 could configure the operation of the nodes 108a-108c, 110a-110c, and 112. The server 114 could also support security in the system 100, such as by distributing cryptographic keys or other security data to various components in the system 100 (like to the nodes 108a-108c, 110a-110c, and 112). The server 114 includes any suitable structure for configuring wireless networks and providing security information.

In one aspect of operation, the overall design of a wireless network can be planned and validated using one or more wireless network planning and validation devices 116a-116b. For example, a planning and validation device 116a-116b can be used to create a new design for a wireless network to be installed. The planning and validation device 116a-116b can also be used to modify the design for an existing wireless network.

Among other things, a planning and validation device 116a-116b can allow a user to define different regions within a given site, where those different regions have different wireless propagation characteristics. The planning and validation device 116a-116b can also allow the user to place wireless devices over a map, drawing, or other image of the site and view wireless coverage areas provided by those wireless devices. In addition, the planning and validation device 116a-116b can identify estimated wireless paths between the wireless devices and verify whether the user-defined placement of wireless devices satisfies one or more criteria (such as a desired redundancy of wireless network paths).

In this way, a network designer or other personnel can more easily plan and validate a wireless network to meet any quality of service (QoS) requirements or other requirements. Factors that influence wireless propagation can be transformed into simple and easy-to-understand terminology for non-technical users. These factors can include propagation losses, decay exponents, environment dependencies, directional antenna gains, Fresnel zone effects, multipath propagations, signal-to-noise ratios, and equivalent isotropically radiated power (EIRP) regulations. Moreover, by selecting a few parameters and dividing an industrial facility or other site into sub-regions, a user is able to plan a multi-radio network (such as a network with ISA100.11a and WiFi devices) with ease. The parameters can include settings such as the country of deployment, the type of RF environment, any required data rate, a desired noise floor, and heights of the wireless devices.

Each planning and validation device 116a-116b includes any suitable structure for planning a design of a wireless network and verifying the design against one or more criteria. For example, each planning and validation device 116a-116b could represent a computing device that executes a wireless network planning and validation application. In this example, the planning and validation devices 116a-116b include a wireless device 116a and a wired device 116b. The wireless device 116a could represent a laptop computer, tablet computer, smartphone, personal digital assistant, or other portable computing device that communicates over a wireless connection. The wired device 116b could represent a desktop computer, laptop computer, server computer, or other suitable computing device that communicates over a wired connection.

Although FIG. 1 illustrates one example of an industrial control and automation system 100, various changes may be made to FIG. 1. For example, the system 100 could include any number of each component. Also, the functional division shown in FIG. 1 is for illustration only. Various components in FIG. 1 could be combined, subdivided, or omitted and additional components could be added according to particular needs. Further, while the wireless network is illustrated in FIG. 1 as being used along with a wired controller 104 and wired process elements 102, the wireless network could be used without any wired process elements or controllers. In addition, FIG. 1 illustrates one example operational environment where a wireless network planning and validation device could be used. The wireless network planning and validation device could be used to plan and validate any suitable wireless network in any suitable environment, regardless of whether that environment relates to industrial process control and automation.

Figure 2:
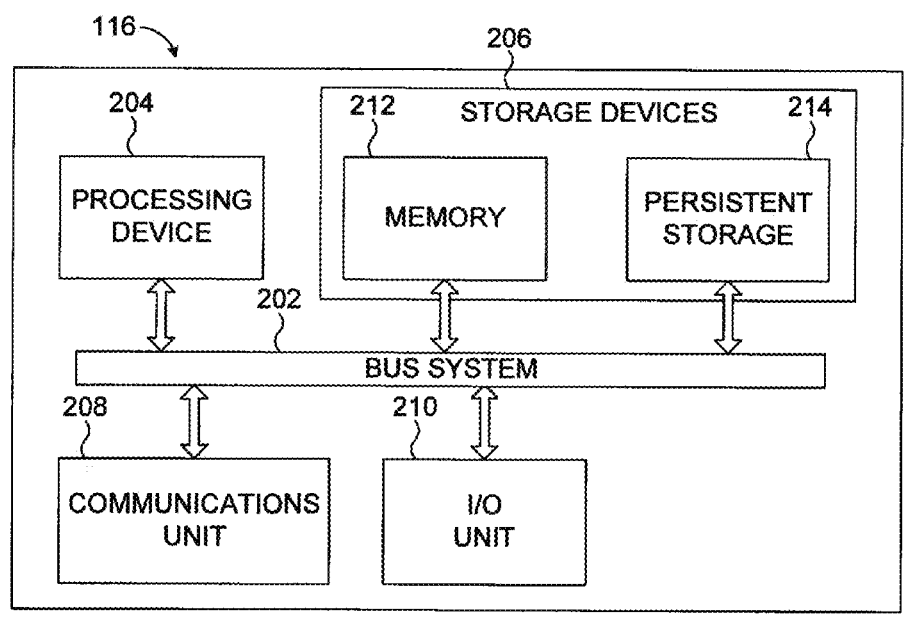
FIG. 2 illustrates an example wireless network planning and validation device according to this disclosure.

FIG. 2 illustrates an example wireless network planning and validation device 116 according to this disclosure. As shown in FIG. 2, the planning and validation device 116 includes a bus system 202, which supports communication between at least one processing device 204, at least one storage device 206, at least one communications unit 208, and at least one input/output (I/O) unit 210.

The processing device 204 executes instructions that may be loaded into a memory 212. The processing device 204 may include any suitable number(s) and type(s) of processors or other devices in any suitable arrangement. Example types of processing devices 204 include microprocessors, microcontrollers, digital signal processors, field programmable gate arrays, application specific integrated circuits, and discrete circuitry.

The memory 212 and a persistent storage 214 are examples of storage devices 206, which represent any structure(s) capable of storing and facilitating retrieval of information (such as data, program code, and/or other suitable information on a temporary or permanent basis). The memory 212 may represent a random access memory or any other suitable volatile or non-volatile storage device(s). The persistent storage 214 may contain one or more components or devices supporting longer-term storage of data, such as a ready only memory, hard drive, Flash memory, or optical disc.

The communications unit 208 supports communications with other systems or devices. For example, the communications unit 208 could include a network interface card that facilitates communications over the network 106. The communications unit 208 could also include a wireless transceiver facilitating communications over a wireless network. The communications unit 208 may support communications through any suitable physical or wireless communication link(s).

The I/O unit 210 allows for input and output of data. For example, the I/O unit 210 may provide a connection for user input through a keyboard, mouse, keypad, touchscreen, or other suitable input device. The I/O unit 210 may also send output to a display, printer, or other suitable output device.

As described in more detail below, the planning and validation device 116 can execute an application that presents a graphical user interface (GUI) to a user. The GUI can be used to import an image of an industrial facility or other site and establish various parameters for a wireless network. The GUI can also be used to identify different regions of the site that have different wireless propagation characteristics. The GUI can further be used to place representations of wireless devices on the image of the site and view the resulting wireless coverage areas provided by the wireless devices. In addition, after the planning and validation device 116 analyzes the wireless network created using the user-identified wireless devices, the GUI can present validation results indicating whether the resulting wireless network satisfies one or more criteria.

Although FIG. 2 illustrates one example of a wireless network planning and validation device 116, various changes may be made to FIG. 2. For example, various components in FIG. 2 could be combined, further subdivided, or omitted and additional components could be added according to particular needs. Also, computing devices can come in a wide variety of configurations, and FIG. 2 does not limit this disclosure to any particular configuration of computing device.

Figure 3:
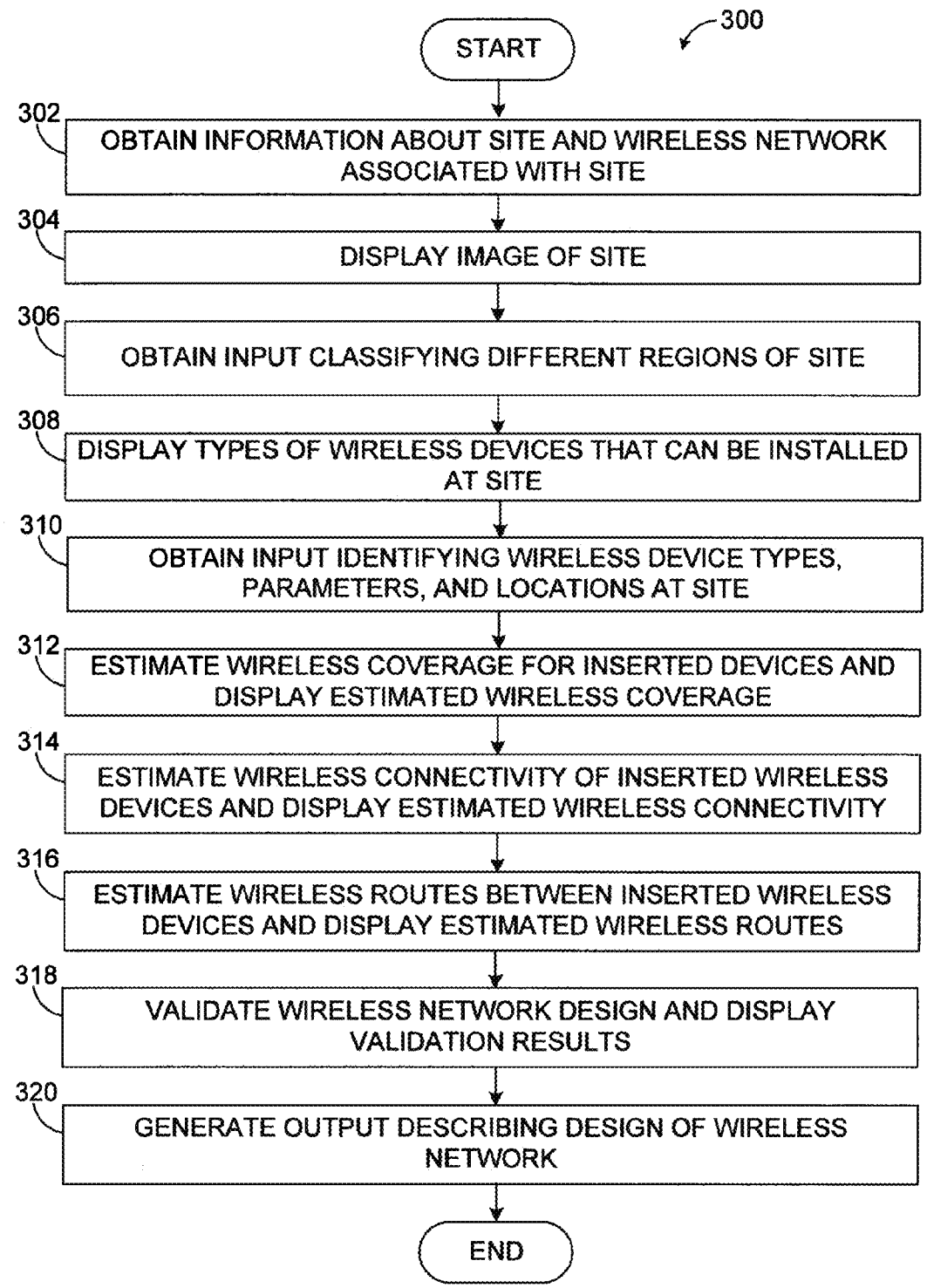
FIG. 3 illustrates an example method for wireless network planning and validation according to this disclosure.

FIG. 3 illustrates an example method 300 for wireless network planning and validation according to this disclosure. For ease of explanation, the method 300 is described as being used by the wireless network planning and validation device 116 operating in the system 100 of FIG. 1. However, the method 300 could be used with any other suitable industrial control and automation system or with any non-industrial control and automation system.

As part of the description of FIG. 3, references are made to FIGS. 4 through 11, which illustrate an example GUI 400 that supports wireless network planning and validation according to this disclosure. Again, for ease of explanation, the GUI is described as being used by the wireless network planning and validation device 116 operating in the system 100 of FIG. 1. However, the GUI could be supported by any other suitable device operating in any suitable environment.

As shown in FIG. 3, information about a site and a wireless network associated with the site is obtained at step 302. This could include, for example, the planning and validation device 116 obtaining information about a wireless network to be installed at an industrial facility or other location. This could also include the planning and validation device 116 obtaining information about an existing wireless network to be modified at an industrial facility or other location.

Figure 4:
FIGS. 4 through 11 illustrate an example graphical user interface that supports wireless network planning and validation according to this disclosure.

The information could be obtained in any suitable manner, such as by using the GUI 400 in FIG. 4. As can be seen in FIG. 4, the GUI 400 includes a country of deployment section 402, an RF environment section 404, a design parameters section 406, a description section 408, and a site map section 410. The country of deployment section 402 includes a drop-down menu allowing a user to specify the country in which a wireless network has been or will be deployed. Different countries have different rules and regulations regarding the operations of wireless devices, which affect which wireless devices can be used at a site and how those devices can be configured (such as the transmit powers, antenna types, or specific frequencies that can or cannot be used).

The RF environment section 404 allows the user to specify the type of environment in which a wireless network has been or will be deployed. In this example, the user is allowed to select one of three options, namely an outdoor environment (where most devices are in line of sight and low interference is expected), an industrial environment (where obstacles may be present and intermediate interference is expected), or a high-interference environment. Note that these three options are for illustration only and that other or additional options could be provided and associated with different RF environments.

The design parameters section 406 allows the user to specify different parameters related to wireless communications. In this example, the design parameters section 406 includes a drop-down menu for identifying the desired data rate and a text box for identifying the desired noise floor. Other or additional design parameters could also be included. The description section 408 includes a text box that allows the user to enter a textual description, such as notes related to the site or the wireless network being designed.

The site map section 410 allows the user to identify an image of a site to be used during definition of the wireless network. In this example, the site map section 410 includes radio buttons that allow the user to identify an image of a site using on online map (such as a GOGGLE EARTH image), a user-defined image location, or a blank image of a defined size. The site map section 410 also allows the user to specify whether distances are expressed in feet, meters, or other measures of distance.

Returning to FIG. 3, an image of the site is displayed to the user at step 304, and input classifying different regions of the site is obtained at step 306. This could include, for example, the planning and validation device 116 displaying the image of the site to the user. This could also include the planning and validation device 116 receiving pointer inputs (such as mouse inputs) identifying different types of regions within the site, where the different types of regions are associated with different wireless propagation characteristics. This can be referred to as "region classification."

Figure 5:
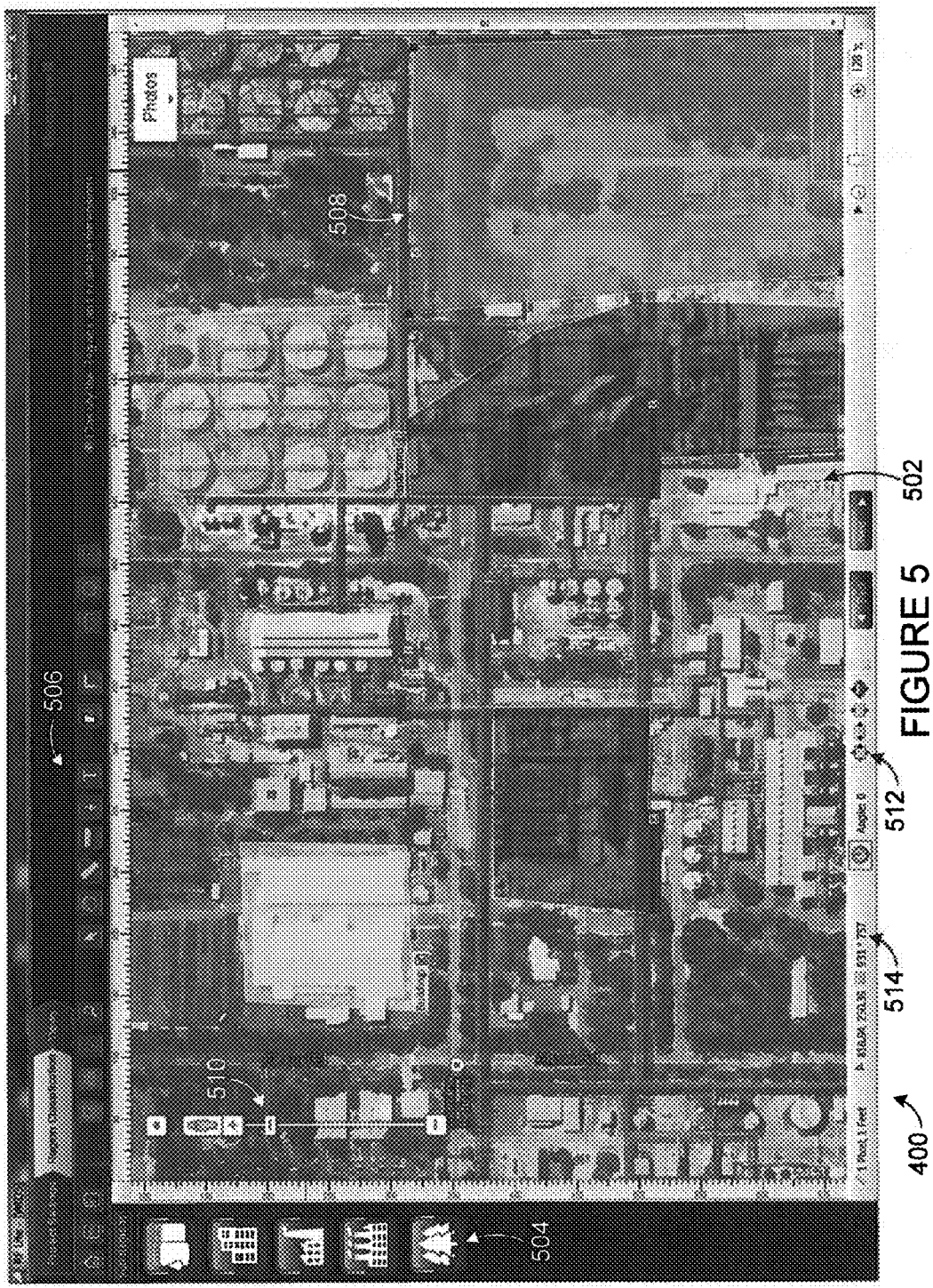

An example of this is shown in FIG. 5, where the GUI 400 displays an image 502 (which is the image selected in the site map section 410 of FIG. 4). The GUI 400 also includes a set of icons 504, which identify different types of regions that can be identified within the image 502 of the site. Moving from top to bottom in FIG. 5, the icons 504 allow the user to select and identify regions of the site associated with a tank farm, buildings, a light industrial process area, a heavy industrial process area, and a forested area. Note that other or additional types of regions could also be selected and defined. The GUI 400 further includes a set of drawing tools 506, which can be used by the user to identify different regions within the image 502 and scale the dimensions of those different regions.

Once the image 502 is displayed, the user can use a mouse or other pointing device to select one of the icons 504. After selecting the icon 504, the user can select the appropriate drawing tool(s) 506 and use the pointing device to define a region 508 within the image 502. This process can be repeated any number of times to define any number of regions 508. Each defined region 508 could have any suitable size, shape, and dimensions. The shape could be a regular or irregular shape with any number of curved or straight sides. Each region 508 can also have a color or other indicator that is based on the type of that region, where different types of regions have different indicators. For each region 508, the user could identify various features of that region 508, such as via a pop-up menu. The features could include the types of materials present in that region 508, obstacles in that region 508, and the heights of any obstacles in that region 508.

In this example, the user has identified five regions 508, although any number of additional regions could be defined within the image 502. Each region 508 has an associated label that can be selected to set the features of that region 508. As described below, the defined regions are used to estimate the coverage areas of wireless devices placed within the site. If a specific region 508 is selected by the user, information about that region 508 can also be presented in the GUI 400. For instance, the size of a selected region (such as in terms of total square feet or total square meters) could be displayed within the GUI 400.

The GUI 400 in FIG. 5 includes several additional components. Map controls 510 can be used to zoom into or out of the image 502 shown in the GUI 400. Controls 512 can be used to expand, contract, or rotate the image 502 shown in the GUI 400. An information bar 514 presents various information about the image 502, such as the scale of the image 502 and the pixel size of the image 502.

Returning to FIG. 3, various types of wireless devices are presented to the user at step 308. Input identifying selected wireless devices, parameters of the selected devices, and locations of the selected devices are obtained at step 310. This could include, for example, the planning and validation device 116 displaying a list of wireless devices that can be selected by the user. This could also include the planning and validation device 116 allowing the user to drag and drop selected wireless devices into the image of the site and allowing the user to set one or more parameters of each device. The parameters of each selected device could be set to default values based on, among other things, the various information previously received from the user, such as the country of deployment, RF environment, and characteristics of the defined regions. Note that the wireless devices here could support a single wireless protocol or multiple wireless protocols. As a specific example, the wireless devices could include a WiFi wireless radio and/or an ISA100.11a wireless radio. However, each wireless device could include any number of wireless radios, and each wireless radio could support one or multiple wireless protocols.

Figure 6:
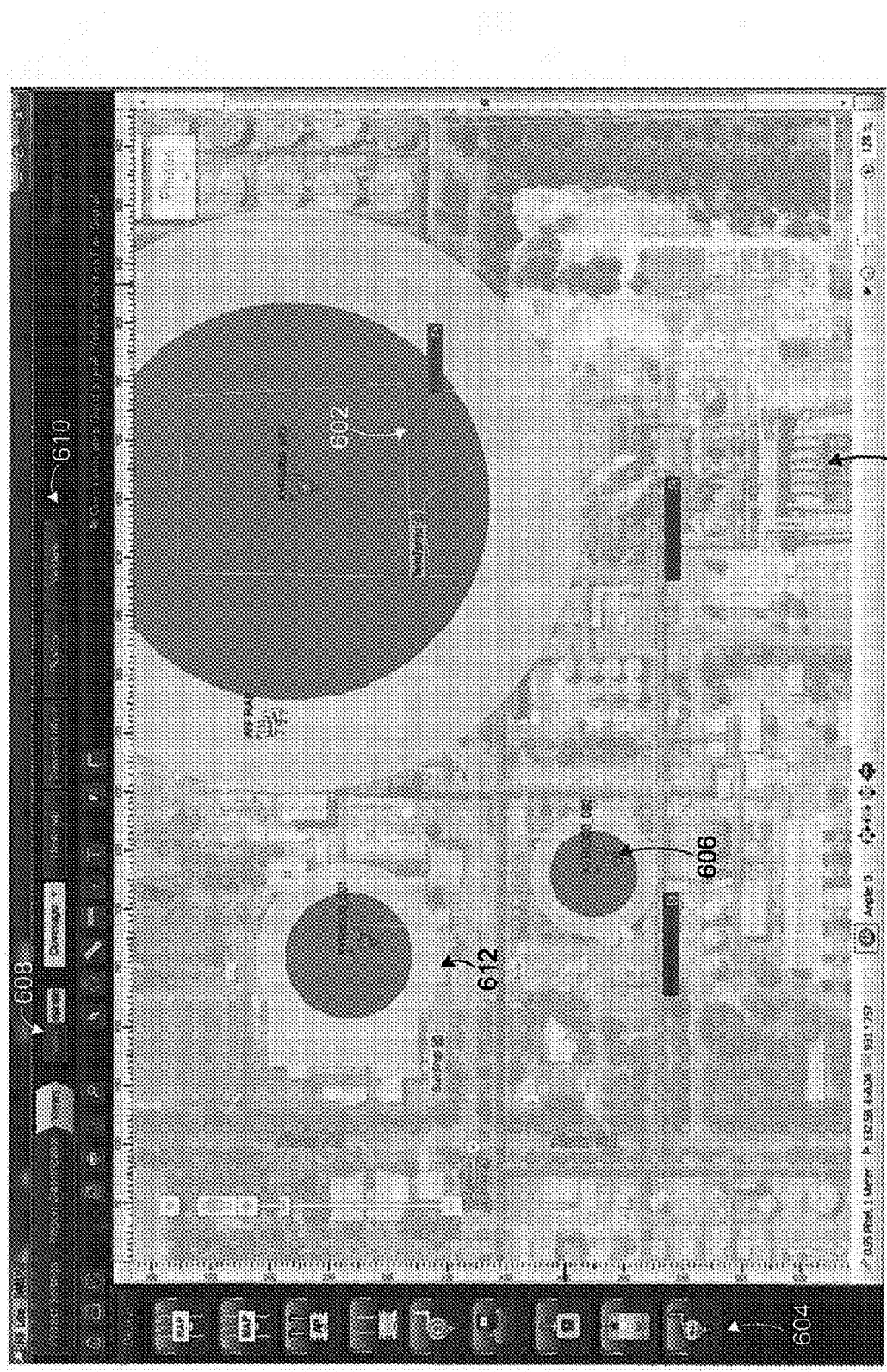

An example of this is shown in FIG. 6, where the GUI 400 displays the previously-selected image 502 and outlines 602 of the defined regions 508. The GUI 400 also includes a list 604 of different types of wireless devices. The user can drag an instance of each desired type of wireless device onto a specific location within the image 502. Each time this occurs, the GUI 400 inserts an icon 606 representing the selected wireless device at the specified location in the image 502. Once inserted into the image 502, each icon 606 can be selected in order to set one or more parameters of the associated wireless device, such as via a pop-up window. The parameters can include transmit power, number of antennas, orientation of antennas, and height of the wireless device. Each icon 606 can also be moved within the image 502 to change the location of the associated wireless device or deleted to remove the associated wireless device from the proposed network.

A control 608 in the GUI 400 allows the user to switch between different types of wireless protocols or technologies. This allows the user to place wireless devices supporting different protocols into the same image 502 of the site. For example, the user can select a first protocol using the control 608, and the GUI 400 can present a list 604 of wireless devices that support the first protocol. The user can also select a second protocol using the control 608, and the GUI 400 can present another list 604 of wireless devices that support the second protocol. Note that a multi-radio wireless device that supports both protocols could be presented in both lists. This allows the user to design a wireless network that supports multiple protocols.

Returning to FIG. 3, once wireless devices have been selected by the user and positioned within the image 502 of the site, various planning and validation functions can be performed. For example, estimated wireless coverage areas for the inserted wireless devices can be estimated and displayed to the user at step 312. This could include, for example, the planning and validation device 116 estimating the geographic extent to which each inserted wireless device is able to effectively communicate with other wireless devices. An example technique for estimating the wireless coverage area of a wireless device through different defined regions of a site is described below with respect to FIG. 12.

An example of this is again shown in FIG. 6, where the user has selected a "Coverage" option in a set of controls 610. The coverage option causes the GUI 400 to display coverage indicators 612 for one or more wireless devices that have been selected by the user. In this example, coverage indicators 612 are provided for three wireless devices supporting the protocol selected using the control 608. The user could select the wireless devices for which the coverage indicators 612 are shown in any suitable manner, such as by clicking on certain icons 606. Each coverage indicator 612 here includes an inner portion identifying better wireless coverage and an outer portion identifying weaker wireless coverage, and color-coding or other indicators could be used to distinguish the different portions. Note, however, that any other suitable coverage indicators could be used.

Figure 7:
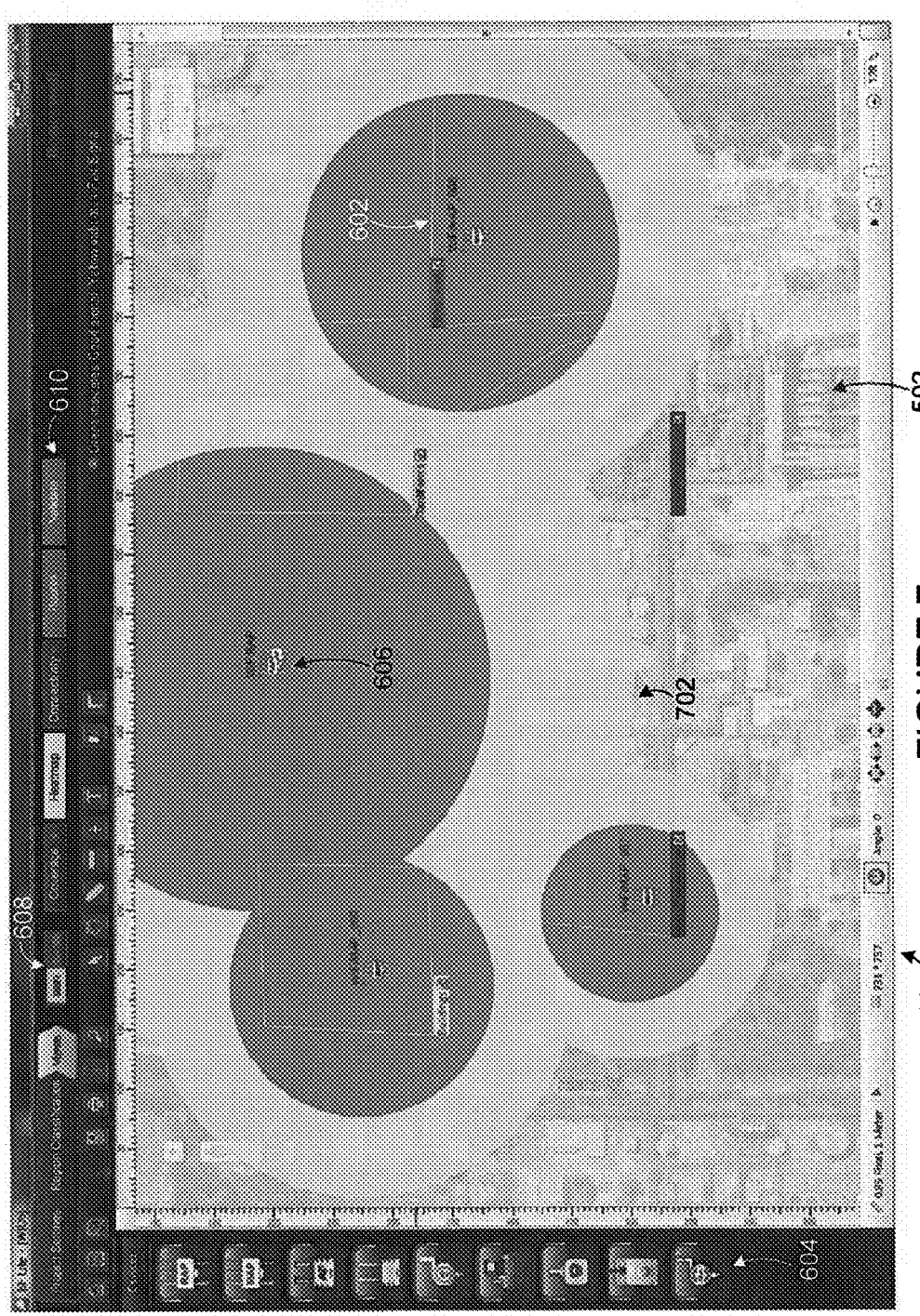

Another example of this is shown in FIG. 7, where the user has selected a "Heatmap" option in the set of controls 610. The heatmap option causes the GUI 400 to display a combined coverage indicator 702 for the entire collection of inserted wireless devices (or at least for those wireless devices supporting the selected protocol). The individual wireless devices need not be selected by the user here. Once again, color-coding or other indicators could be used to distinguish different qualities of wireless coverage.

Returning to FIG. 3, estimated wireless connectivity between the inserted wireless devices can be estimated and displayed to the user at step 314. This could include, for example, the planning and validation device 116 estimating which inserted wireless devices would be able to communicate with one another based on the previously-determined coverage areas of the wireless devices.

Figure 8:
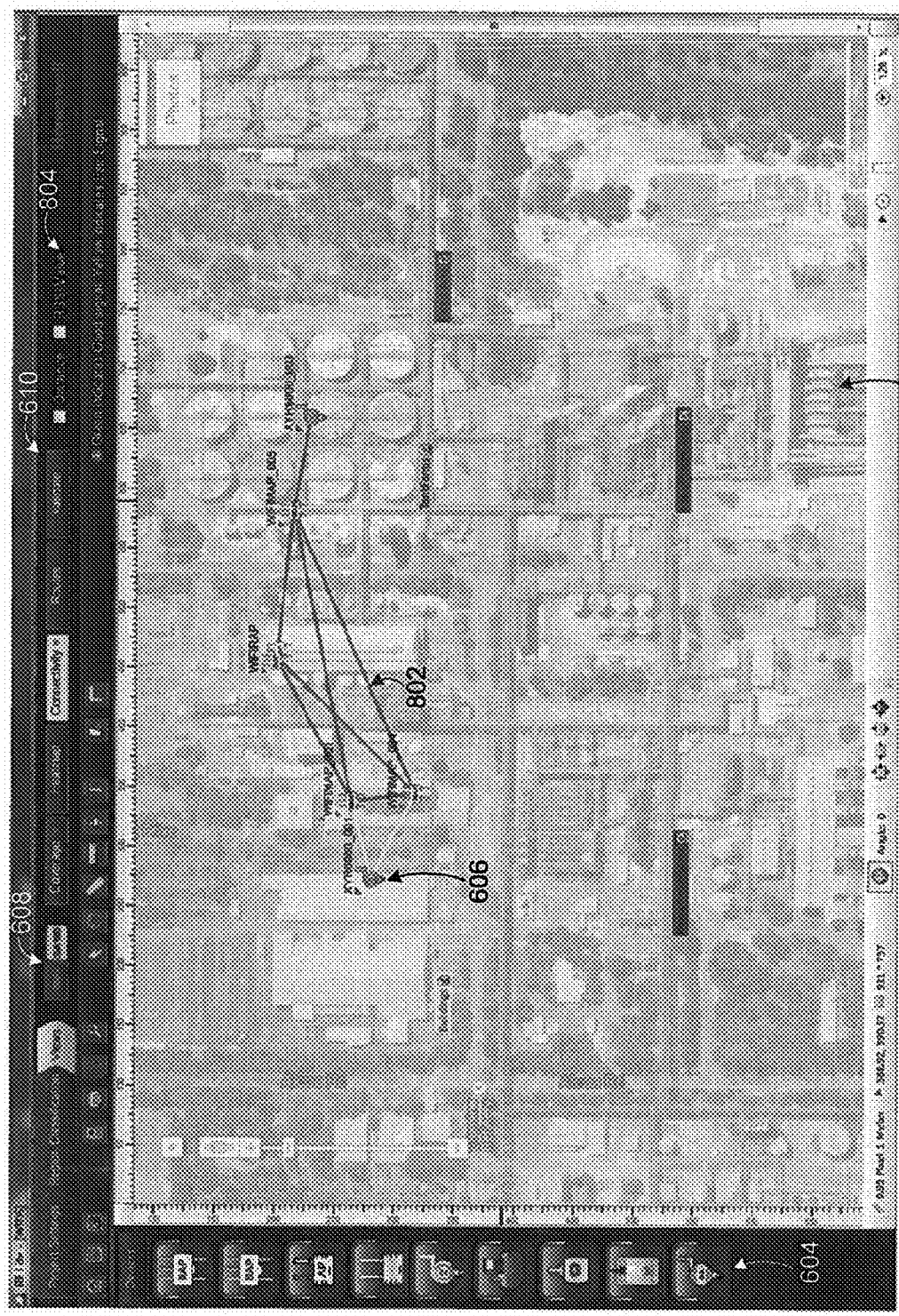

An example of this is shown in FIG. 8, where the user has selected a "Connectivity" option in the set of controls 610. The connectivity option causes the GUI 400 to display the various icons 606 of the inserted wireless devices and connection lines 802 identifying wireless connections between those devices. The wireless connections could be color-coded or other indicators could be used in order to identify the qualities of the wireless connections. For instance, green connection lines 802 could indicate wireless connections with higher qualities, and yellow connection lines 802 could indicate wireless connections with lower qualities. Controls 804 can be used to display information about the wireless connections represented by the connection lines 802. In this example, the controls 804 allow the user to view distances and/or estimated receive signal strength indicator (RSSI) values involving the wireless connections.

Returning to FIG. 3, estimated wireless routes between two of the inserted wireless devices can be estimated and displayed to the user at step 316. This could include, for example, the planning and validation device 116 estimating, for two of the wireless devices, the likely primary and secondary communication paths between those two wireless devices. In some embodiments, the user could select both of the wireless devices and view the likely primary and secondary paths between those devices. In other embodiments, the user could select a single wireless device and view the likely primary and secondary paths between that device and a gateway node.

Figure 9:
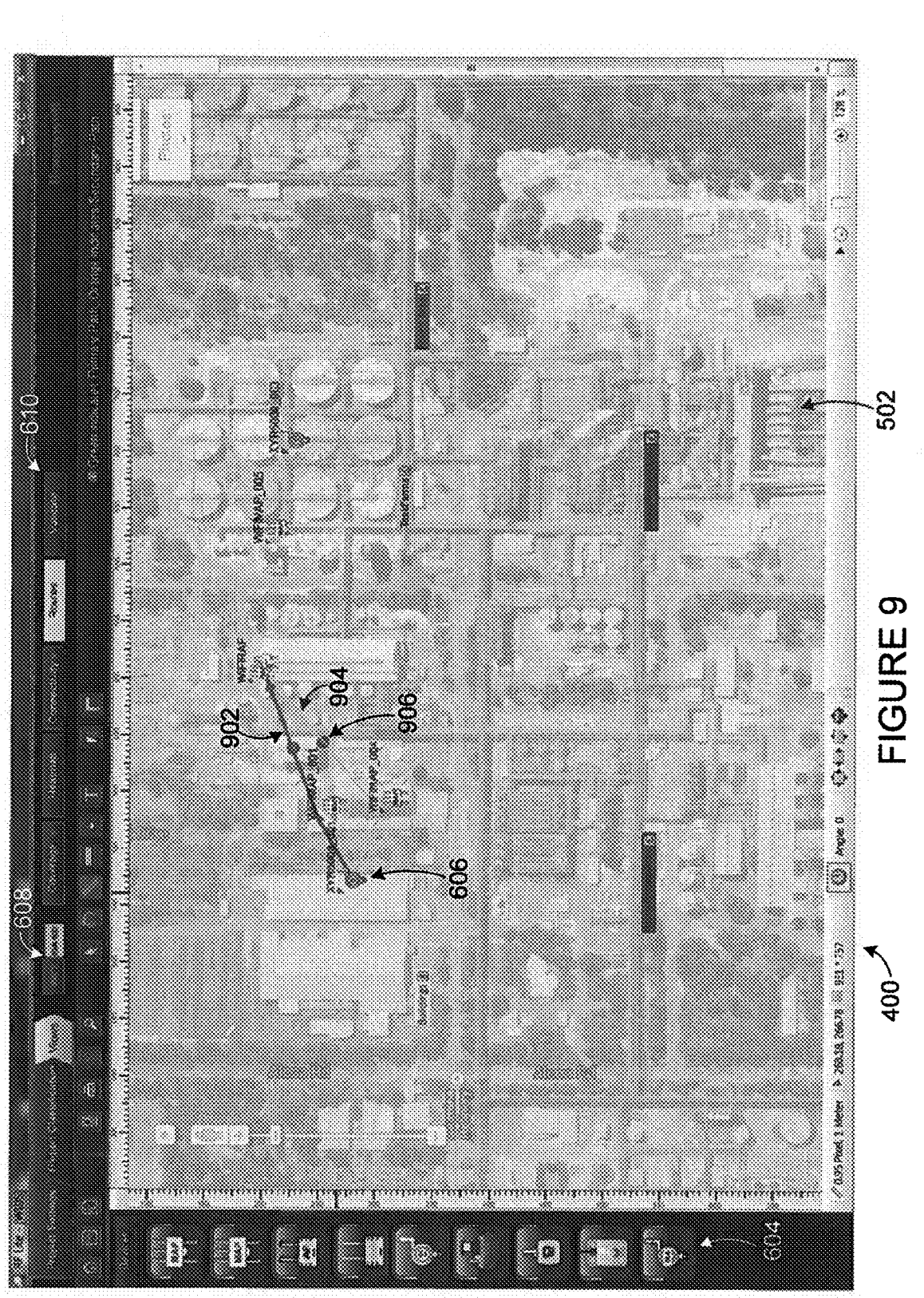

An example of this is shown in FIG. 9, where the user has selected a "Routes" option in the set of controls 610. The routes option causes the GUI 400 to display the various icons 606 of the inserted wireless devices and two connection lines 902-904 identifying primary and secondary connections between two of those devices. The connection lines 902-904 could be color-coded or other indicators could be used in order to distinguish between the primary and secondary connections. For instance, a green connection line could identify the primary communication path, and a yellow connection line could identify the secondary communication path. A circle or other indicator 906 can move along each connection line 902-904 to represent the direction(s) of data flow(s) along the associated connection, such as data flows to or from a gateway node.

Returning to FIG. 3, the design of the proposed wireless network is validated and the validation results are displayed at step 318. This could include, for example, the planning and validation device 116 determining whether the connectivity and routes identified earlier satisfy one or more network criteria. As a particular example, this could include the planning and validation device 116 determining whether each non-gateway wireless device has multiple or redundant communication paths to one or more gateway nodes. In some situations, a network may require each device to have more than one "edge disjoint" route to a gateway node, meaning each device has at least two completely non-overlapping paths to a gateway node. This could also include the planning and validation device 116 determining whether each non-gateway wireless device is able to reach a gateway node via a communication path that has less than a threshold number of hops (a "hop" is defined as a communication from one device to another). As a third example, this could include the planning and validation device 116 identifying parent-child relationships between wireless devices and verifying whether each routing node has suitable capacity for handling the expected amount of data traffic. The capacity of a wireless device can be dependent on various factors, such as the memory capacity of the device, whether the device is line-powered or battery-powered, and the bandwidth that the device supports. The parent-child relationships could be identified in any suitable manner, such as by using probabilistic models. Any other or additional criteria could be applied to the proposed network design.

Figure 10:
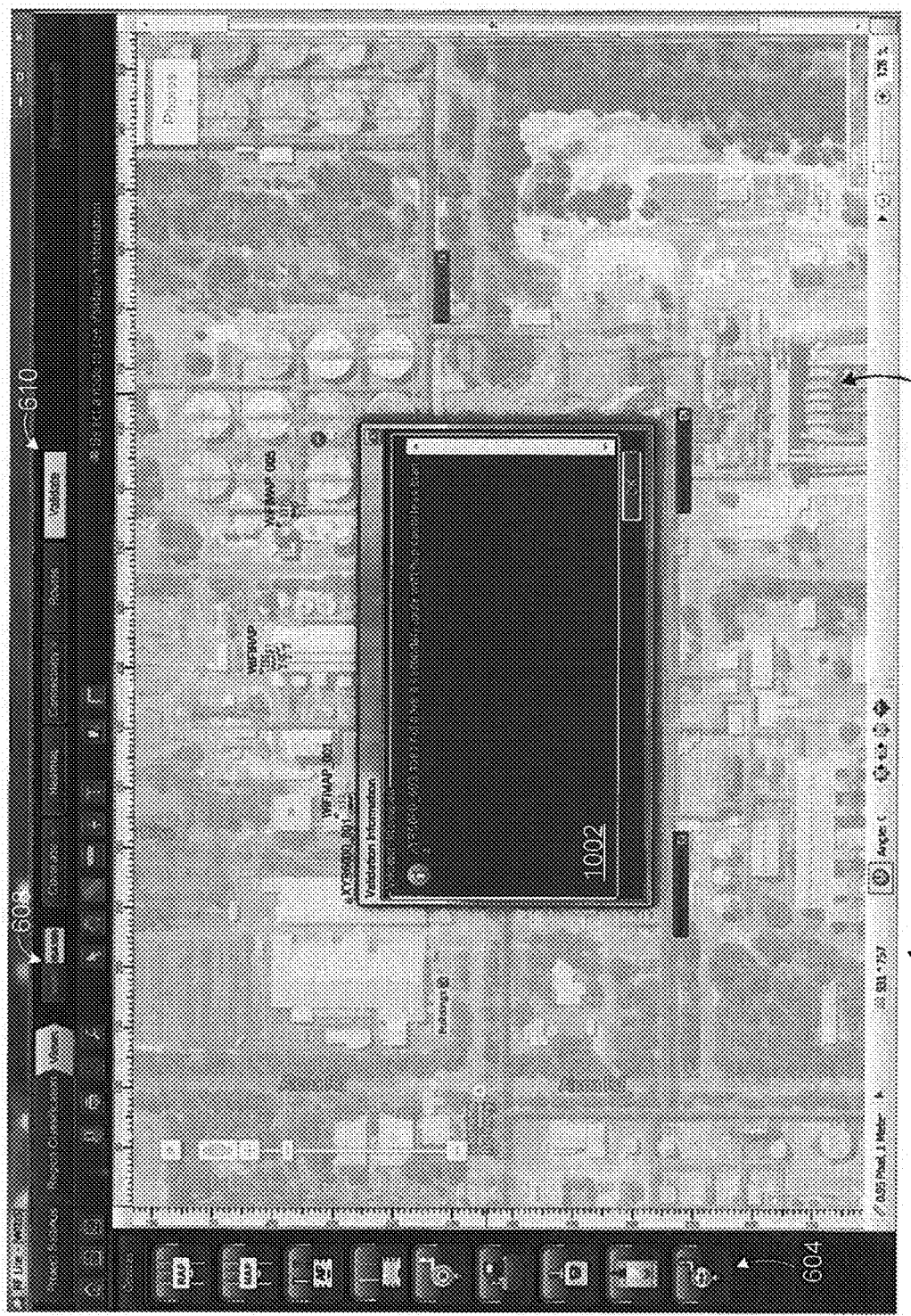
Figure 11:
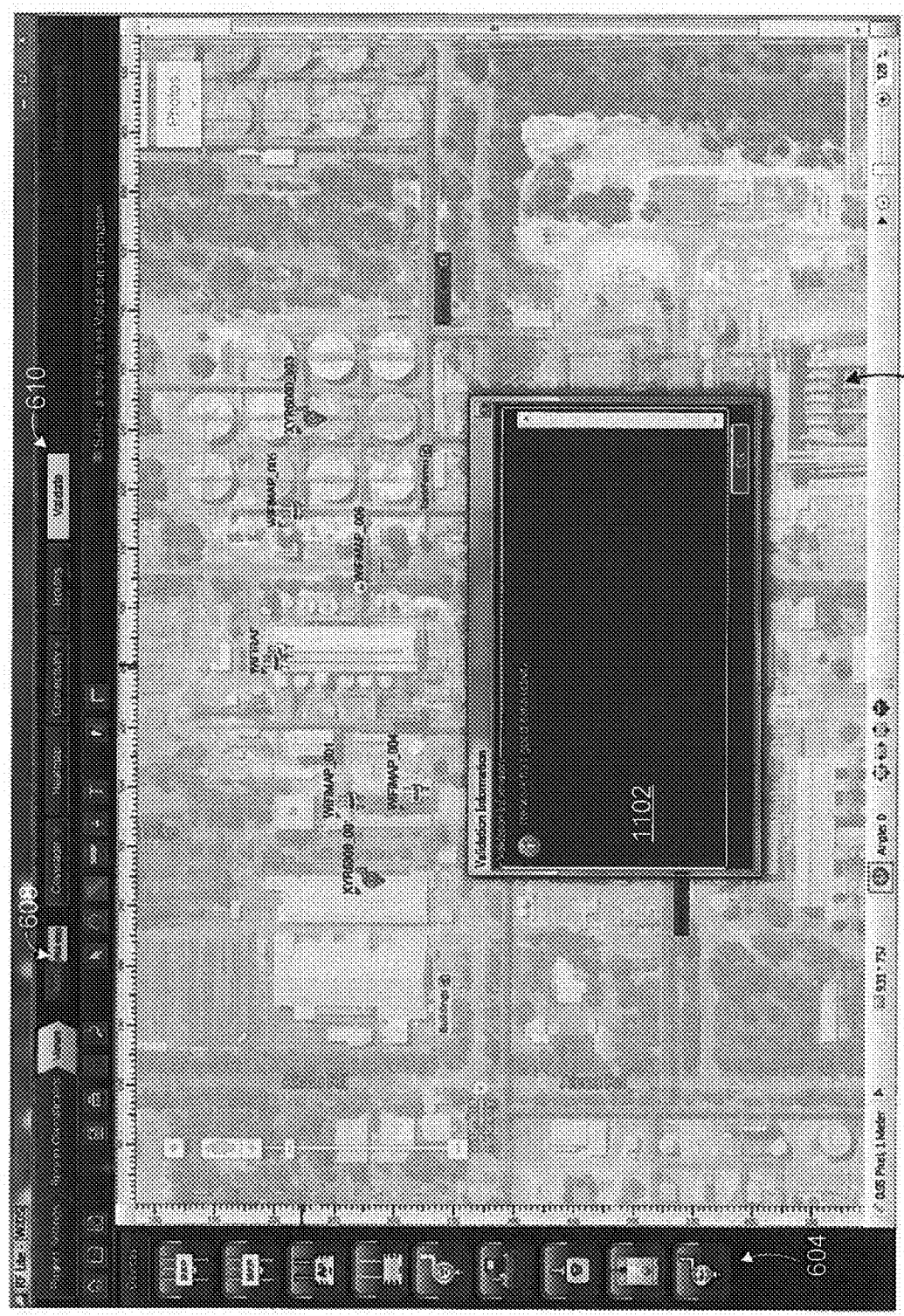

An example of this is shown in FIGS. 10 and 11, where the user has selected a "Validation" option in the set of controls 610. The validation option causes the GUI 400 to display the results of the validation process. In FIG. 10, a pop-up window 1002 indicates that the proposed network design fails to satisfy all validation criteria and explains why the validation failed. The user could take any suitable corrective action, such as adding an additional wireless device to the image 502 and attempting to validate the modified network design. In FIG. 11, a pop-up window 1102 indicates that another proposed network design satisfies all validation criteria.

Once a network design is validated, a description of the wireless network can be generated and output at step 320. This could include, for example, the planning and validation device 116 generating a bill of materials describing the wireless devices to be included in the wireless network. Any additional information could be included, such as locations and configurations of the wireless devices to be included in the wireless network.

While not shown, the user may at various points repeat certain steps of FIG. 3 in order to change the proposed design of the wireless network. For example, when viewing the coverage or heatmap display, the user could elect to add or move wireless devices or change parameters of the wireless devices (such as transmit power, number of antennas, antenna orientation, or device height) to alter the coverage areas of the wireless devices. Alternatively, the user could alter the coverage area of a wireless device (such as by clicking on and dragging a coverage indicator 612) and the device 116 changing the parameters of the wireless device. Similarly, when viewing the connectivity or routes display, the user could elect to add or move wireless devices or change parameters of the wireless devices to alter the communication paths through the wireless network.

Note that while various steps are described above as being performed based on user input, one, some, or all of these steps could also be performed in an automated manner. For example, the different regions 508 of a site could be defined automatically, such as based on image analysis. As another example, different types of wireless devices could be selected and positioned within an image automatically or parameters of the wireless devices could be selected automatically in order to meet one or more criteria. A user could be involved in this automated process in any suitable manner, such as to confirm or modify automatically-identified regions, devices, or parameters.

Although FIG. 3 illustrates one example of a method 300 for wireless network planning and validation, various changes may be made to FIG. 3. For example, while shown as a series of steps, various steps in FIG. 3 could overlap, occur in parallel, occur multiple times, or occur in a different order. Although FIGS. 4 through 11 illustrate one example of a GUI 400 that supports wireless network planning and validation, various changes may be made to FIGS. 4 through 11. For instance, the layout and content of the GUI 400 in each figure are for illustration only. Also, while certain input/output mechanisms (such as text boxes, radio buttons, and drop-down menus) are shown here, the GUI 400 could support any other or additional mechanisms for interacting with a user.

Figure 12:
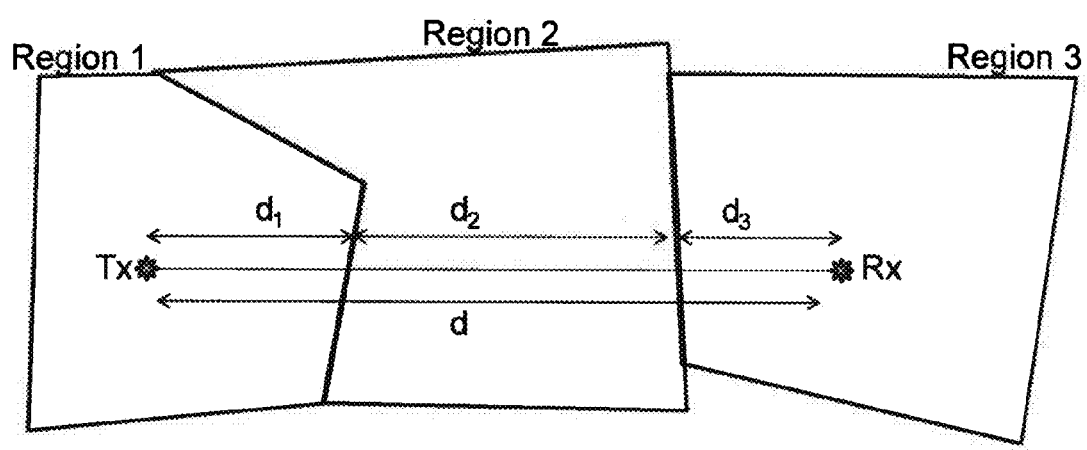
FIG. 12 illustrates an example technique for estimating wireless propagation characteristics during wireless network planning and validation according to this disclosure.

FIG. 12 illustrates an example technique for estimating wireless propagation characteristics during wireless network planning and validation according to this disclosure. This technique could be useful, for example, during step 312 to identify the wireless coverage area of a wireless device operating at a site with regions having differing wireless propagation characteristics.

In general, the standard model for wireless propagation losses in the presence of obstacles can be expressed as:

$$P_R = P_T - L_0 - 10 \cdot n \cdot \log\left(\frac{d}{d_0}\right) - \sum L_i \qquad (1)$$

Here, $P_R$ denotes receive power, and $P_T$ denotes transmit power. Also, $L_0$ denotes the path loss at distance $d_0$, n denotes the path loss exponent, and d denotes the distance between the transmitter and the receiver. In addition, $L_i$ denotes the combined losses due to all obstacles, where i represents the index of the obstacles. However, this model does not incorporate any mechanism for recognizing that wireless signals between the transmitter and the receiver may pass through regions having different wireless propagation characteristics.

An example of this is shown in FIG. 12, where a transmitter Tx and a receiver Rx are separated by a total distance d. The transmitter Tx is located in a first region, the receiver Rx is located in a third region, and a second region separates the first and third regions. Here, wireless signals between the transmitter Tx and the receiver Rx may pass through three regions having different wireless propagation characteristics.

In some embodiments of this disclosure, the model for wireless propagation losses in the presence of obstacles is modified as follows:

$$P_R = P_T - L_0 - 10 \cdot n \cdot \log\left(\frac{d}{d_0}\right) - \sum \zeta_i \cdot d_i \qquad (2)$$

where:

$$\Sigma d_i = d \qquad (3)$$

Here, ζ denotes an "obstacle density" and can be expressed as attenuation per unit length (like dB/m). For each $i^{th}$ region, that region is characterized by its own $\pi_i$ value, and $d_i$ denotes the distance between the transmitter and receiver in that region. The loss due to obstacles here is linear with distance. For the example shown in FIG. 12, Equation (2) can be rewritten as:

$$P_R = P_T - L_0 - 10 \cdot n \cdot \log\left(\frac{d}{d_0}\right) - \zeta_1 \cdot d_1 - \zeta_2 \cdot d_2 - \zeta_3 \cdot d_3 \quad (4)$$

In some embodiments, the wireless network planning and validation device 116 uses Equation (2) to estimate the coverage areas of wireless devices. However, the model in Equation (2) may be too computationally expensive for particular implementations of the planning and validation device 116. For example, it may be computationally difficult, for every point on a coverage contour, to find the intersection points of the Tx-Rx line with the boundaries of different regions. In other embodiments, a simplification of Equation (2) can be used to reduce the computational complexity without excessively sacrificing accuracy. In many use cases, there may be a limited number of defined regions 508 (such as less than ten), and the transmitter Tx and receiver Rx are often in the same region or in adjacent regions. As a result, Equation (2) could be simplified as follows:

$$P_R = P_T - L_0 - 10 \cdot n \cdot \log\left(\frac{d}{d_0}\right) - \zeta_T \cdot d_T - \zeta_R \cdot d_R \quad (5)$$

where $\zeta_T$ and $d_T$ are associated with the transmitter's region and $\zeta_R$ and $d_R$ are associated with the receiver's region.

In Equation (5), instead of finding the values of $d_T$ and $d_R$, the values can be approximated using $L_0$. For example, each region can have an associated parameter $L_{0i}$, and the location of the transmitter Tx and the receiver Rx can be sufficient to compute the receive power as follows:

$$P_R = P_T - L_{0Tx} - \underline{(L_{0Rx} - L_{0Tx})} - 10 \cdot n \cdot \log\left(\frac{d}{d_0}\right) \quad (6)$$

where:

$$\underline{(a-b)} = a - b \text{ if } a > b \quad (7)$$

$$= 0 \text{ otherwise} \quad (8)$$

Here, $L_{0Tx}$ denotes the path loss constant in the transmitter's region, and $L_{0Rx}$ denotes the path loss constant in the receiver's region.

In these embodiments, the ζ value(s) could typically be in the range of about 0.05 to about 0.5. Also, average distances $d_i$ could be about 100 m. As a result, variations in signal strength due to these parameters may typically be on the order of a few decibels.

Although FIG. 12 illustrates one example of a technique for estimating wireless propagation characteristics during wireless network planning and validation, various changes may be made to FIG. 12. For example, each region could have any suitable size, shape, and dimensions.

Among other things, the above approach supports the following features. First, the planning and validation device 116 provides the ability to plan multi-radio networks (like both ISA100.11a and WiFi networks). A user can choose the wireless coverage or connectivity for each type of radio and plan the network so that it meets the requirements of all radios. Second, the above approach provides RF environment-based and region classification-based planning. The device 116 calibrates propagation parameters for each type of environment, and the device 116 classifies different types of regions in each environment for finer calibration of propagation parameters. Third, the device 116 validates a planned network for route redundancy and device capacity. If any device does not have the required or desired number of redundant routes or has an excessive number of child nodes such that its capacity is exceeded, the user is alerted for that particular device or alerted to add an addition wireless device.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    displaying an image associated with a site at which a wireless network is to be installed or modified;
    displaying positions of multiple wireless devices within the image, different ones of the wireless devices configured to support different wireless protocols, the wireless devices and the positions of the wireless devices forming at least part of a design of the wireless network;
    displaying, within the image, at least one of: (i) estimated wireless coverage areas of the wireless devices, (ii)

estimated wireless connectivity between the wireless devices, and (iii) estimated communication routes between the wireless devices; and validating the design of the wireless network against one or more network criteria using at least one of the estimated wireless coverage areas, the estimated wireless connectivity, and the estimated communication routes;

wherein validating the design of the wireless network against the one or more network criteria comprises determining whether each wireless device has capacity to handle an estimated number of child nodes in the wireless network.

2. The method of claim 1, further comprising:
identifying multiple regions of the image corresponding to multiple areas of the site that have different wireless propagation characteristics; and
estimating at least one of the wireless coverage areas, the wireless connectivity, and the communication routes using the wireless propagation characteristics associated with at least some of the multiple regions.

3. The method of claim 2, wherein identifying the multiple regions of the image comprises:
displaying multiple icons that identify different types of areas in the site and that are selectable by a user;
receiving a user selection of one of the icons; and
receiving a user selection of a portion of the image, the selected portion of the image associated with the type of area identified by the selected icon.

4. The method of claim 2, wherein estimating at least one of the wireless coverage areas, the wireless connectivity, and the communication routes comprises using a model of wireless propagation losses, the model incorporating an obstacle density value associated with at least one of the different types of areas in the site.

5. The method of claim 4, wherein, for two of the wireless devices located in two different specified areas of the site:
the model incorporates two obstacle density values associated with the two specified areas of the site and does not incorporate any obstacle density values associated with any areas of the site separating the two specified areas of the site.

6. The method of claim 1, wherein validating the design of the wireless network against the one or more network criteria comprises:
validating the design of the wireless network against one or more network criteria for each of the wireless protocols.

7. The method of claim 1, wherein validating the design of the wireless network against the one or more network criteria comprises:
determining whether a specified number of redundant communication paths exist in the wireless network.

8. The method of claim 1, wherein displaying at least one of the estimated wireless coverage areas, the estimated wireless connectivity, and the estimated communication routes comprises:
displaying at least one of first estimated wireless coverage areas, first estimated wireless connectivity, and first estimated communication routes for wireless devices using a first of the wireless protocols; and
displaying at least one of second estimated wireless coverage areas, second estimated wireless connectivity, and second estimated communication routes for wireless devices using a second of the wireless protocols.

9. The method of claim 8, wherein the wireless protocols include a WiFi protocol and an ISA100.11a protocol.

10. An apparatus comprising:
at least one memory configured to store an image associated with a site at which a wireless network is to be installed or modified; and
at least one processing device configured to:
initiate display of the image;
initiate display of positions of multiple wireless devices within the image, different ones of the wireless devices configured to support different wireless protocols, wherein the wireless devices and the positions of the wireless devices form at least part of a design of the wireless network;
initiate display, within the image, of at least one of: (i) estimated wireless coverage areas of the wireless devices, (ii) estimated wireless connectivity between the wireless devices, and (iii) estimated communication routes between the wireless devices; and
validate the design of the wireless network against one or more network criteria using at least one of the estimated wireless coverage areas, the estimated wireless connectivity, and the estimated communication routes;

wherein, to validate the design of the wireless network against the one or more network criteria the at least one processing device is configured to determine whether each wireless device has capacity to handle an estimated number of child nodes in the wireless network.

11. The apparatus of claim 10, wherein the at least one processing device is further configured to:
identify multiple regions of the image corresponding to multiple areas of the site that have different wireless propagation characteristics; and
estimate at least one of the wireless coverage areas, the wireless connectivity, and the communication routes using the wireless propagation characteristics associated with at least some of the multiple regions.

12. The apparatus of claim 11, wherein the at least one processing device is configured to identify the multiple regions of the image by:
initiating display of multiple icons that identify different types of areas in the site and that are selectable by a user;
receiving a user selection of one of the icons; and
receiving a user selection of a portion of the image, the selected portion of the image associated with the type of area identified by the selected icon.

13. The apparatus of claim 11, wherein the at least one processing device is configured to estimate at least one of the wireless coverage areas, the wireless connectivity, and the communication routes using a model of wireless propagation losses, the model incorporating an obstacle density value associated with at least one of the different types of areas in the site.

14. The apparatus of claim 13, wherein, for two of the wireless devices located in two different specified areas of the site:
the model incorporates two obstacle density values associated with the two specified areas of the site and does not incorporate any obstacle density values associated with any areas of the site separating the two specified areas of the site.

15. The apparatus of claim 10, wherein the at least one processing device is further configured to:
identify at least one of: one or more first characteristics of the site and one or more second characteristics of the wireless network; and identify one or more parameters for each wireless device based on at least one of the one or more first characteristics and the one or more second characteristics.

16. The apparatus of claim 10, wherein the at least one processing device is configured to:
initiate display of at least one of first estimated wireless coverage areas, first estimated wireless connectivity, and first estimated communication routes for wireless devices using a first of the wireless protocols; and
initiate display of at least one of second estimated wireless coverage areas, second estimated wireless connectivity, and second estimated communication routes for wireless devices using a second of the wireless protocols.

17. The apparatus of claim 10, wherein the wireless devices are collectively configured to support at least three different wireless protocols.

18. A non-transitory computer readable medium embodying a computer program, the computer program comprising instructions that when executed cause at least one processing device to:
initiate display of an image associated with a site at which a wireless network is to be installed or modified;
initiate display of positions of multiple wireless devices within the image, different ones of the wireless devices configured to support different wireless protocols, the wireless devices and the positions of the wireless devices forming at least part of a design of the wireless network;
initiate display, within the image, of at least one of: (i) estimated wireless coverage areas of the wireless devices, (ii) estimated wireless connectivity between the wireless devices, and (iii) estimated communication routes between the wireless devices; and
validate the design of the wireless network against one or more network criteria using at least one of the estimated wireless coverage areas, the estimated wireless connectivity, and the estimated communication routes;
wherein the instructions that when executed cause the at least one processing device to validate the design of the wireless network against the one or more network criteria comprise instructions that when executed cause the at least one processing device to determine whether each wireless device has capacity to handle an estimated number of child nodes in the wireless network.

19. The computer readable medium of claim 18, wherein the computer program further comprises instructions that when executed cause the at least one processing device to:
identify multiple regions of the image corresponding to multiple areas of the site that have different wireless propagation characteristics; and
estimate at least one of the wireless coverage areas, the wireless connectivity, and the communication routes using the wireless propagation characteristics associated with at least some of the multiple regions.

20. The computer readable medium of claim 18, wherein:
the instructions that when executed cause the at least one processing device to estimate at least one of the wireless coverage areas, the wireless connectivity, and the communication routes comprises instructions that when executed cause the at least one processing device to use a model of wireless propagation losses; and
the model incorporates an obstacle density value associated with at least one of the different types of areas in the site.

21. The computer readable medium of claim 20, wherein, for two of the wireless devices located in two different specified areas of the site:
the model incorporates two obstacle density values associated with the two specified areas of the site and does not incorporate any obstacle density values associated with any areas of the site separating the two specified areas of the site.

* * * * *